United States Patent
Dursch (10) Patent No.: US 9,554,099 B1
(45) Date of Patent: Jan. 24, 2017

(54) MULTIFUNCTIONAL SECURITY SURVEILLANCE AND LIGHTING DEVICE

(71) Applicant: Herbert L. Dursch, Patchogue, NY (US)

(72) Inventor: Herbert L. Dursch, Patchogue, NY (US)

(*) Notice: Subject to any disclaimer, the term of this patent is extended or adjusted under 35 U.S.C. 154(b) by 169 days.

(21) Appl. No.: 14/259,913

(22) Filed: Apr. 23, 2014

(51) Int. Cl.
*H04N 7/18* (2006.01)

(52) U.S. Cl.
CPC .................... *H04N 7/183* (2013.01)

(58) Field of Classification Search
CPC .................. H04N 7/181; H04N 7/183
See application file for complete search history.

(56) References Cited

U.S. PATENT DOCUMENTS

| | | | |
|---|---|---|---|
| 2,418,067 A | | 3/1947 | Carpenter, Sr. |
| 3,664,247 A | | 5/1972 | Tellerman |
| 3,882,514 A | | 5/1975 | Graham |
| 7,413,357 B2 | | 8/2008 | Badalian |
| 7,703,996 B1 | * | 4/2010 | Sexton, Jr. ............... G03B 5/00 248/218.4 |
| 8,248,292 B2 | | 8/2012 | Batten et al. |
| 8,382,387 B1 | | 2/2013 | Sandoval |
| 2005/0128291 A1 | | 6/2005 | Murakami |
| 2006/0195716 A1 | * | 8/2006 | Bittner ............ G08B 13/19656 714/6.11 |
| 2008/0100707 A1 | * | 5/2008 | Brown ................. G08B 13/196 348/158 |
| 2011/0141727 A1 | | 6/2011 | Kim |
| 2013/0076930 A1 | * | 3/2013 | Border ............... H04N 5/23229 348/222.1 |
| 2014/0018686 A1 | * | 1/2014 | Medelius ............. A61B 5/7203 600/483 |
| 2014/0247363 A1 | * | 9/2014 | Venable, Jr. ........... H04N 7/181 348/159 |

* cited by examiner

*Primary Examiner* — Dave Czekaj
*Assistant Examiner* — Nam Pham
(74) *Attorney, Agent, or Firm* — Richard L Miller (57) ABSTRACT

A multifunctional security and surveillance and lighting apparatus which takes the appearance of a prior art conventional lighting apparatus to discretely observe an area. The device has an optical video camera, a computer, an infrared detector, a motion detector, and a speaker. The device communicates the output of its various sensors to a remote server. The device further has a high output lighting apparatus, which apparatus is smaller than prior art conventional high intensity discharge lamps, allowing the housing to store surveillance equipment while still appearing similar to a prior art conventional housing.

11 Claims, 10 Drawing Sheets

MULTIFUNCTIONAL SECURITY SURVEILLANCE AND LIGHTING DEVICE

CROSS REFERENCE TO RELATED APPLICATIONS

This application claims the benefit of U.S. Provisional Application No. 61/813,870, Titled: Multifunctional Security LED Light, filed on Apr. 19, 2013, which is incorporated fully herein by reference.

BACKGROUND OF THE INVENTION

Field of the Invention

The present invention relates to a(n) lighting system, and more particularly, a MULTIFUNCTIONAL SECURITY SURVEILLANCE AND LIGHTING DEVICE.

Description of the Prior Art

Numerous innovations for lighting and surveillance systems have been provided in the prior art that will be described. Even though these innovations may be suitable for the specific individual purposes to which they address, however, they differ from the present invention.

A FIRST EXAMPLE, U.S. Pat. No. 2,418,067, Published/Issued on Mar. 25, 1947, to Carpenter, Sr. teaches a camera and light support to provide a light, strong, rigid and compact box which may be conveniently carried about from place to place, readily opened for removal of its contents, manipulated for positioning it rigidly so as to support and center a camera and/or lights by aid of said contents, and maintained as well as equipped in camera-height varying relationship.

A SECOND EXAMPLE, U.S. Pat. No. 3,664,247, Published/Issued on May 23, 1972, to Tellerman teaches a camera which is automatically activated in response to the change in resistance of a photocell due to the occurrence of an event intended to be detected and recorded. The camera is provided with a network for translating such change in electrical resistance into the automatic activation of the camera drive motor. The camera drive motor is controlled by a relay which activates the motor only when the relay is energized. The relay is in series with a pair of transistor amplifiers, both on which must be conducting for the relay to remain in energized condition. The change in resistance of the photocell creates a change of potential across a condenser which, in turn, causes a temporary flow of current, which current affects the triggering current of a third transistor amplifier. This third transistor amplifier controls the other two transistor amplifiers in such a manner that whenever the triggering current of the third transistor amplifier is changed, either upwardly or downwardly, from a fixed value, one or the other of the two transistor amplifiers in series with the control relay will be rendered non-conducting to unenergize the control relay and thus activate the drive motor of the camera.

A THIRD EXAMPLE, U.S. Pat. No. 3,882,514, Published/Issued on May 6, 1975, to Graham teaches a small portable camera having a self-contained light system and more particularly to the light system wherein the direction of the light beam emitted from the light source thereof will be varied relative to the optical axis of the camera upon manual adjustment of the lens focusing device. The extent of the directional variation will depend upon the distance the subject is from the camera and, thus. the subject will be more effectively illuminated by the light beam resulting in improvement in the quality of the photography obtainable with the camera.

A FOURTH EXAMPLE, U.S. Pat. No. 7,413,357, Published/Issued on Aug. 19, 2008, to Badalian teaches a concealed camera comprising a housing, a subminiature camera and a peep hole of very small size through which the camera may perceive a large field of vision. With a high resolution camera and the tiny peep hole, the camera may be positioned or located in plain view as concealed within a myriad of functional objects, such as a clock, reflector, light or any other common looking device in the area of desired view or surveillance. Multiple concealed cameras may by employed and perhaps synchronized in a surveillance system such that the downstream viewed image may be automatically switched from one image to another as desired by the system user.

A FIFTH EXAMPLE, U.S. Pat. No. 8,248,292, Published/Issued on Aug. 21, 2012, to Batten, et al. teaches a detection device for detecting the presence of a speed detection system, red light camera, or other electronic surveillance means. The device includes a display means whereby the graphical and audible presentation changes from the non alert condition to the alert condition in accordance to a user selectable choice of options, thereby increasing awareness to the surveillance threat.

A SIXTH EXAMPLE, U.S. Pat. No. 8,382,387, Published/Issued on Feb. 26, 2013, to Sandoval teaches a system and method for providing a surveillance camera platform, and house supporting devices in a streetlight housing is disclosed. The device and method uses a cobra head, clamshell style streetlight housings with a lens between the housing sections to increase the volume of the housing. The system uses a lens for capturing image with the camera systems. The camera systems include data transmittal and receiving devices that allow the receipt of data to control the camera systems and the transmission of any necessary image and other data collected with systems contained within the housing. The lens is camouflaged by using a color that matches the rest of the housing. LEDs and reflector are used to provide the lighting function of the streetlight and to further provide space wile reducing heat within the housing. An internal fan is contemplated to further cool the system.

A SEVENTH EXAMPLE, U.S. Patent Office Document No. 20050128291, Published/Issued on Jun. 16, 2005, to Murakami teaches a video surveillance system that automatically keeps track of a moving object in an accurate and efficient manner. The system has two cameras for surveillance. One is a visible-light integrating camera that has a frame integration function to capture visible-light images of objects, and the other is an infrared camera for taking infrared images. A rotation unit tilts and pans the visible-light integrating camera and/or infrared camera, under the control of a tracking controller. Video output signals of those cameras are processed by image processors. The tracking controller operates with commands from a system controller, so that it will keep track of a moving object with the visible-light integrating camera in a first period and with the infrared camera in a second period.

AN EIGHTH EXAMPLE, U.S. Patent Office Document No. 20110141727, Published/Issued on Jun. 16, 2011, to Kim teaches a lamp for a camera-attachable streetlight is provided, which includes a camera-integrated bulb module. In the camera-integrated bulb module, there is a bulb portion, a camera module has a camera for capturing a predetermined area and a transceiver for transmitting data captured by the camera to an external server, a connector is inserted into a commercial socket, for receiving an external commercial power and has the same structure as a commercial connector inserted into a commercial socket, for receiving a commercial power, and a power distributor distributes the power received through the connector to the bulb portion and the camera module.

It is apparent now that numerous innovations for security lighting systems have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a MULTIFUNCTIONAL SECURITY SURVEILLANCE AND LIGHTING DEVICE that avoids the disadvantages of the prior art.

ANOTHER OBJECT of the present invention is to provide a MULTIFUNCTIONAL SECURITY SURVEILLANCE AND LIGHTING DEVICE that is simple and inexpensive to manufacture.

STILL ANOTHER OBJECT of the present invention is to provide a MULTIFUNCTIONAL SECURITY SURVEILLANCE AND LIGHTING DEVICE that is simple to use.

BRIEFLY STATED, STILL YET ANOTHER OBJECT of the present invention is to provide a MULTIFUNCTIONAL SECURITY SURVEILLANCE AND LIGHTING DEVICE that has an appearance similar to a prior art conventional housing for a high intensity discharge lamp, but which also has surveillance equipment therein.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING 10 multifunctional security and surveillance and lighting device
12 high output lighting apparatus
14 optical video camera
16 speaker
18 housing
20 computer
22 communication means
24 remote server
26 motion detector
28 infrared detector
30 wired communication means
32 wireless communication means
34 audio message
36 first power source
38 second power source
40 box of housing 18
42 front panel of housing 18
44 frame of front panel 42 of housing 18
46 pane of front panel 42 of housing 18
48 substantially transparent material
50 hinges
52 portions of pane 46 which are not obscured
54 frosted surface of pane
56 alert light
58 prior art conventional housing
60 high-intensity discharge lamp
62 upper portion of pane 46
64 lower portion of pane 46
66 aperture of box 40
68 microphone
100 method of surveilling an area utilizing a multifunctional security and surveillance and lighting device
102 computer system
104 standby of computer system 102
106 alert from remote server 24
108 activating of computer system
110 broadcasting of audio message 34 by speaker 16
112 remaining active of computer system 102
114 time specified by alert 106
116 time pre-programmed into computer system 102

DETAILED DESCRIPTION OF THE PREFERRED EMBODIMENT

Figure 2:
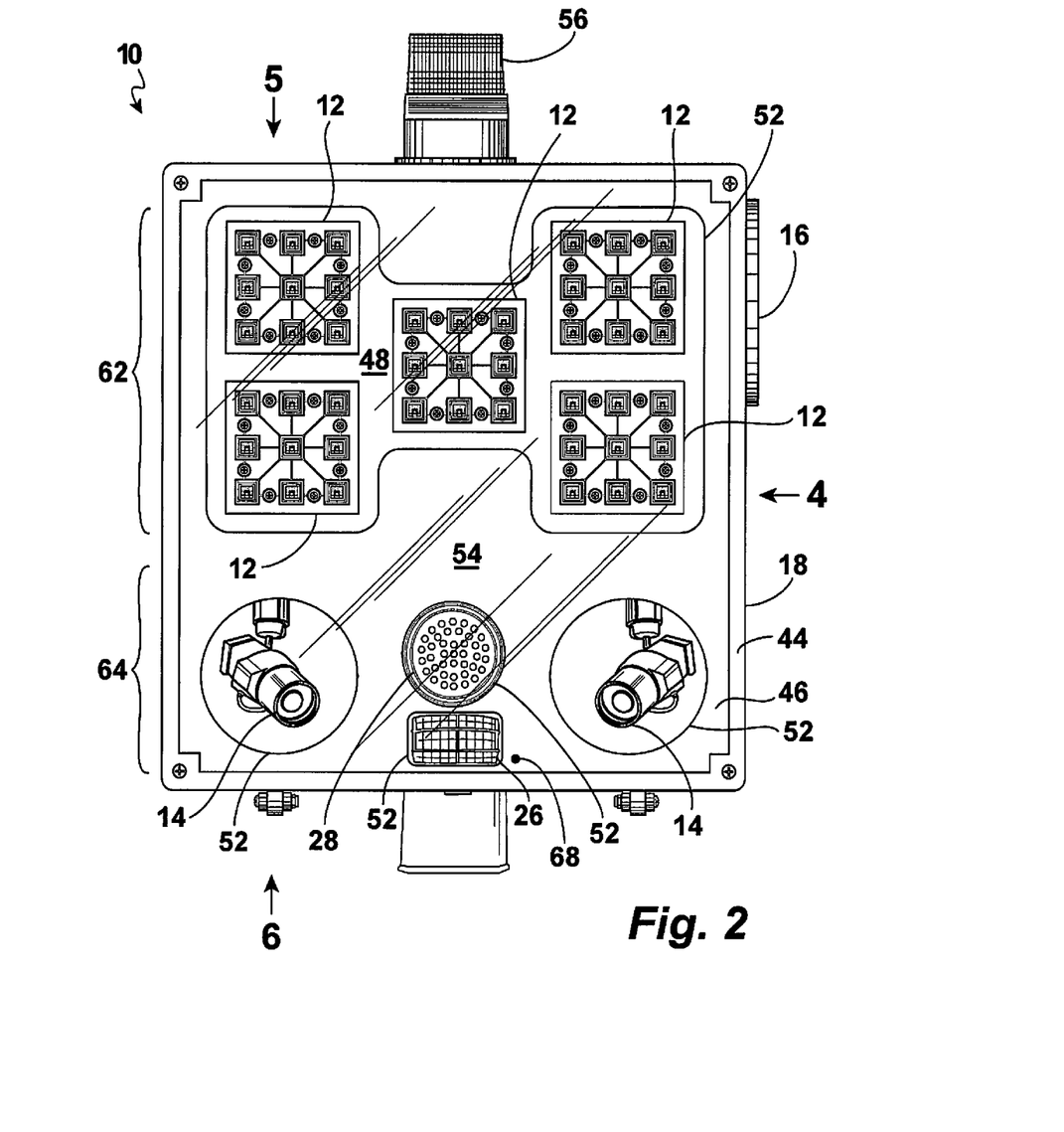
FIG. 2 is a front elevational view of an embodiment of the present invention.
Figure 3:
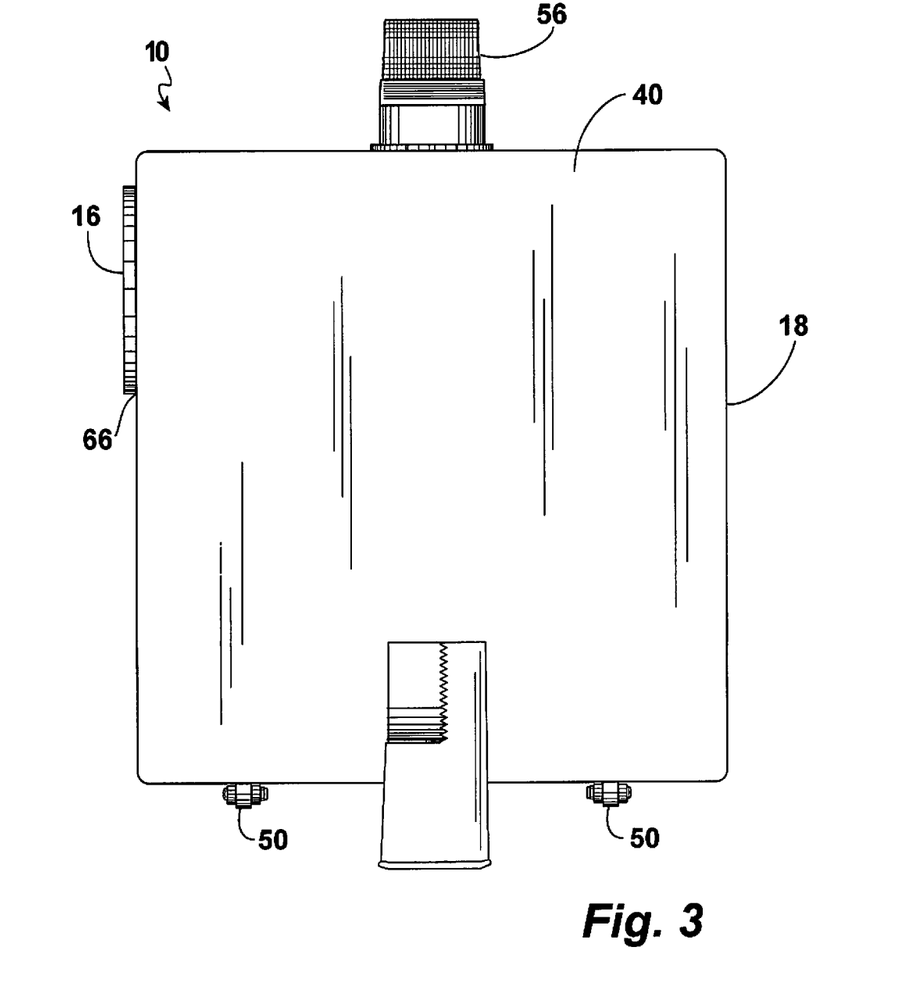
FIG. 3 is a rear elevational view thereof.
Figure 4:
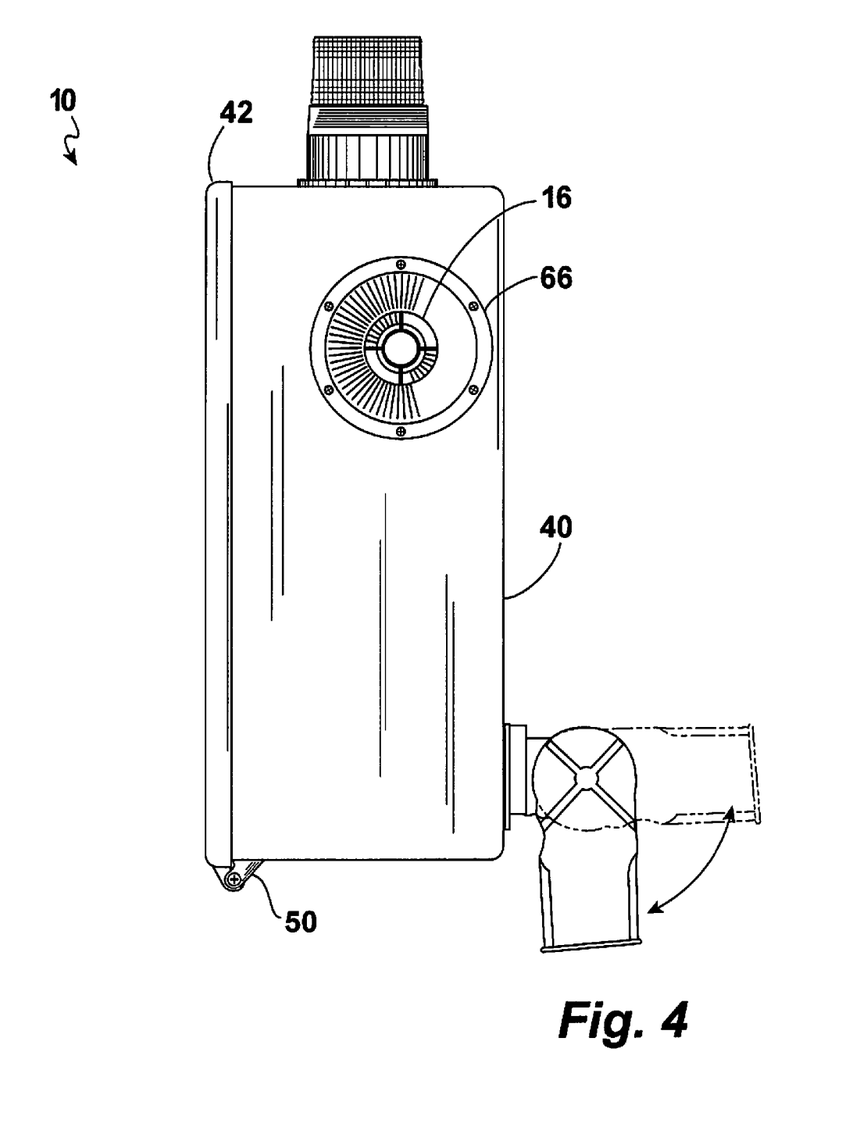
FIG. 4 is a left side elevational view thereof, taken in the direction of arrow 4 in FIG. 2.
Figure 5:
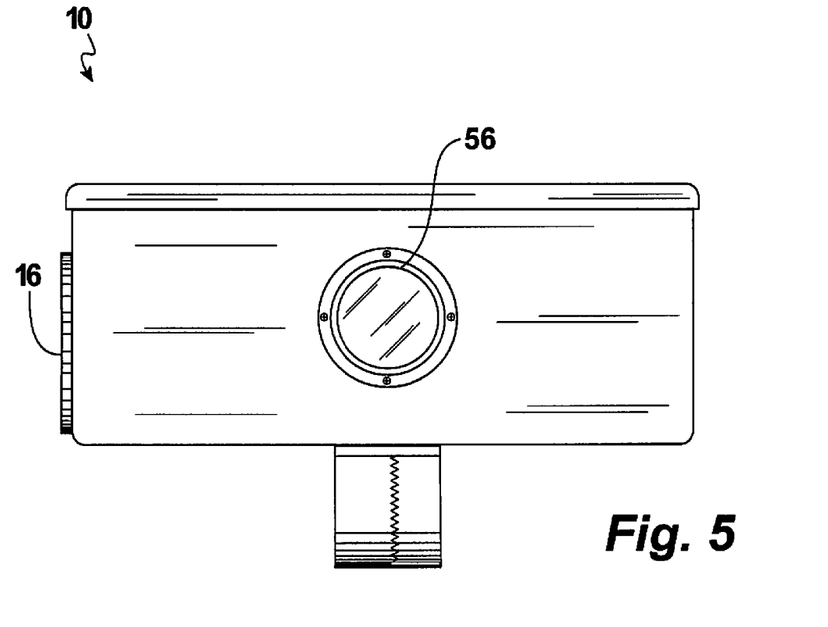
FIG. 5 is a top plan view thereof, taken in the direction of arrow 5 in FIG. 2.
Figure 6:
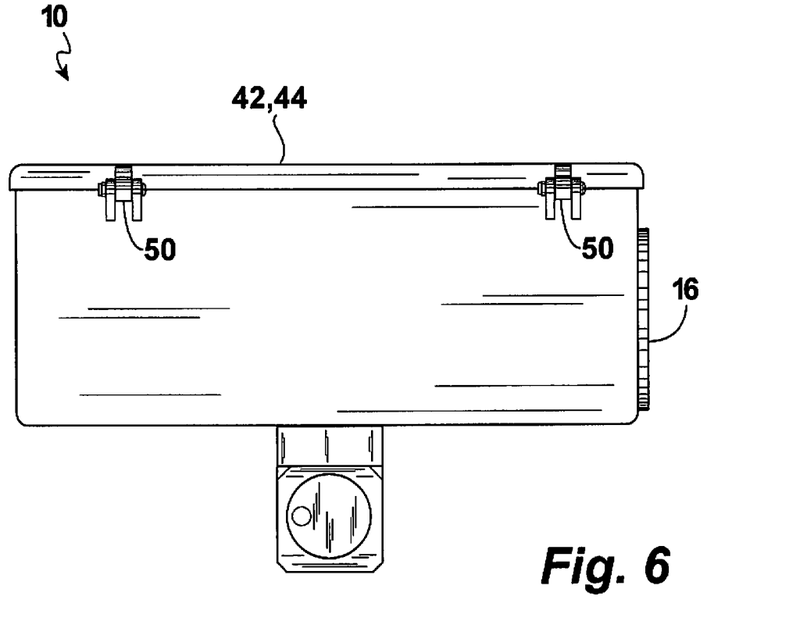
FIG. 6 is a bottom plan view thereof, taken in the direction of arrow 6 in FIG. 2.
Figure 7:
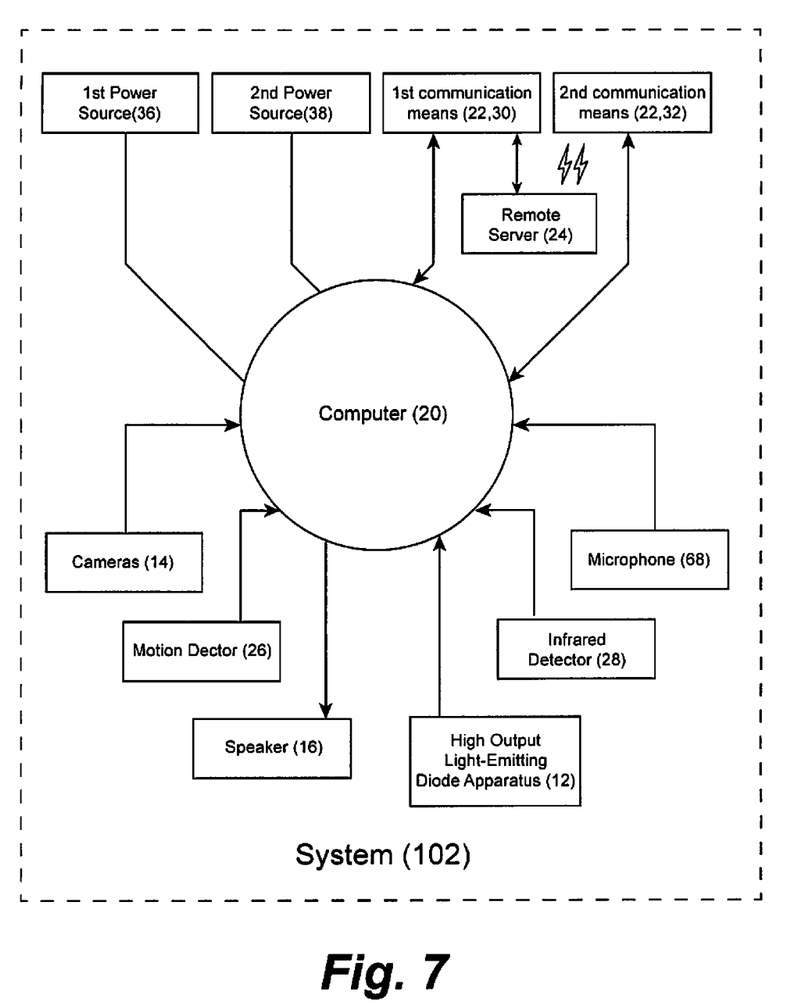
FIG. 7 is a block diagram of an embodiment of the present invention.

Referring now to the figures, in which like numerals indicate like parts, and particularly to FIGS. 2 and 7, disclosed is a multifunctional security and surveillance and lighting device 10 which comprises:

a) at least one high output lighting apparatus 12;
b) at least one optical video camera 14;
c) a speaker 16;
d) a housing 18;
e) a computer 20; and
f) at least one communication means 22.

The housing 18 is for containing the lighting apparatuses 12, the optical video cameras 14, the speaker 16, the computer 20, and the communication means 22. In the embodiment shown in the drawings, five high output light emitting diode apparatuses 12 are utilized, however the number of such apparatuses 12 can vary. Additionally, two cameras 14 are shown in the drawings, but this number can likewise vary.

The speaker 16 and the high output lighting apparatuses 12 are controlled by the computer 20. And the at least one communication means 22 is in communication with the computer 20. The computer 20 receives the output of the optical video cameras 14, and the computer 20 utilizes the at least one communication means 22 to communicate with a remote server 24. The communication with the remote server 24 includes communicating the output of the at least one optical camera 14.

The device further includes a motion detector 26. Likewise to the optical cameras 14, the computer 20 receives the output of the motion detector 26, and communicates the output of the motion detector 26 with the remote server 24.

In a preferred embodiment, the device further comprises at least one infrared detector 28. Likewise to the cameras 14 and motion detector 26, the computer 20 receives the output of the at least one infrared detector 28 and the computer 20 utilizes the at least one communication means 22 to communicate with a remote server 24. The communication with the remote server 24 includes communicating the output of the at least one infrared detector 28. In the drawings, one infrared detector 28 is shown, however more than one could be utilized if so desired.

Detailed Description of the Communication Means 22

Referring now to FIG. 7, in the preferred embodiment, the at least one communication means 22 comprises a communication means 22 selected from the list of:
a) a wired ethernet connection;
b) a wired coaxial connection via a modem;
c) a wired fiber optic connection via a modem;
d) a wired digital subscriber line connection via a modem;
e) a T-carrier connection via a modem;
f) a wireless connection via the IEEE 802.11 standard;
g) a wireless data connection via the Code Division Multiple Access protocol;
h) a wireless data connection via the Global System for Mobile Communications protocol; and
i) a wireless data connection via the Long Term Evolution protocol.

From the above list, communication means 22 (*a*)-(*e*) are wired communication means 30, and communication means 22 (*f*)-(*i*) are wireless communication means 32.

In the preferred embodiment, the at least one communication means 22 comprises two communication means: a wired communications means 30 and a wireless communications means 32. The wired communication means 30 the first communication means, and thereby is for being the primary means of communication 22 between the computer 20 and said remote server 24. The wireless communication means 32 is a second communication means and thereby is for being a backup communication means if the first communication means 30 is disabled.

Detailed Description of the Functionality of the Computer 20

In order to facilitate safety, the speaker 16 may broadcast an audio message 34 sent to the computer 20 via either the wired communication means 22,30 or wireless communication means 22,32. To accomplish this, the computer 20 may request from the remote server 24 an audio message 34 when the motion detector 26 detects motion.

In a preferred construction, the device 10 further comprises a first power source 36 and a second power source 38. The first power source 36 is external power from a power grid, and the second power source 38 is a battery backup. The computer 20 may communicate to the remote server 24 if the first power source 36 is interrupted causing the use of the second power source 38.

Detailed Description of the Structure of the Device 10

In the preferred embodiment, the housing 18 comprises a box 40 and a front panel 42. The front panel 24 is openable to allow access to the components of the device 10. The speaker 16 is mounted in an aperture in the box 40.

The front panel 42 comprises a frame 44 and a pane 46. The pane 46 is surrounded by and secured by said frame 44. The pane is comprised of a substantially transparent material 48, which substantially transparent material 48, in addition to being substantially transparent to visible light, is also substantially transparent to infrared radiation.

To allow access to the internal components the front panel 42 is hingedly attached to the box 40, with hinges 50 connecting the frame 44 of the front panel 42 to the box.

The at least one high output light emitting apparatus 12, the at least one optical video camera 14, the at least one infrared sensor 28, and the motion detector 26 are mounted in the box 40 facing the pane 46. The pane 46 is partially obscured, but has portions which are not obscured 52. The portions of the pane which are not obscured 52 correspond to each of the at least one high output light emitting apparatuses 12, the at least one optical video camera 14, the at least one infrared sensor 28, and the motion detector 26 respectively. In the preferred embodiment, the pane 46 is partially obscured by a frosted surface 54.

Likewise in the preferred embodiment, the device 10 further comprises an alert light 56. The alert light 56 is connected to and controlled by the computer 20, the alert light being mounted on the box 40.

Figure 1:
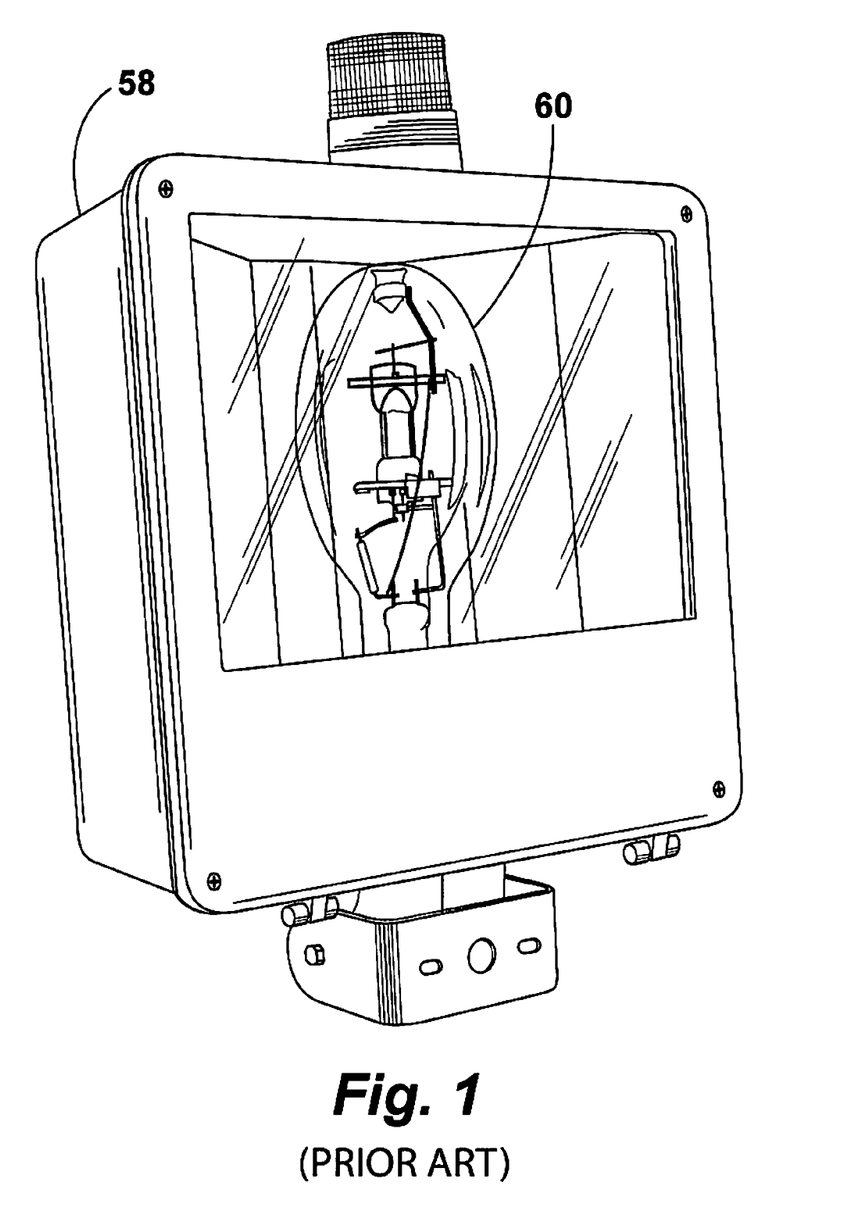
FIG. 1 is a diagrammatic perspective view of a prior art device.

The purpose of the above structures is so that the housing 18 has an appearance and size similar to a prior art conventional housing 58 for a high intensity discharge lamp 60.

The at least one high output lighting apparatus 12 takes less space in the housing 18 than a high intensity discharge lamp 60 would. This is because the preferred high intensity discharge apparatus 12, a high intensity light emitting diode, is much smaller than a high intensity discharge lamp 60. Also, high intensity light emitting diodes operate at much lower temperatures than high intensity discharge lamps 60, so less space has to be devoted to ventilation and cooling in the present invention than in prior art conventional housings 58. The space freed up by the at least one high output lighting apparatus 12 taking less space is utilized to house the other elements of the present invention, allowing for surveillance of an area.

The pane 46 has an upper portion 62 and a lower portion 64. The frosted surface 54 covers a substantial part of the lower portion 64 of the pane 46, which covering of a substantial part of the lower portion 64 of the pane 46 further facilitates having an appearance similar to a prior art conventional housing 58 for a high intensity discharge lamp 60.

In a preferred embodiment, the device further comprises a microphone 68, which said microphone 68 is for surveilling audio in the vicinity of the device 10. The microphone 68 is mounted on the outside of the pane 46 in the lower portion 64 of the pane 46 on a portion thereof which is covered by the frosted surface 54, so that the microphone 68 is difficult to visibly see.

Detailed Description of the Method of Using the Device 10

Figure 8:
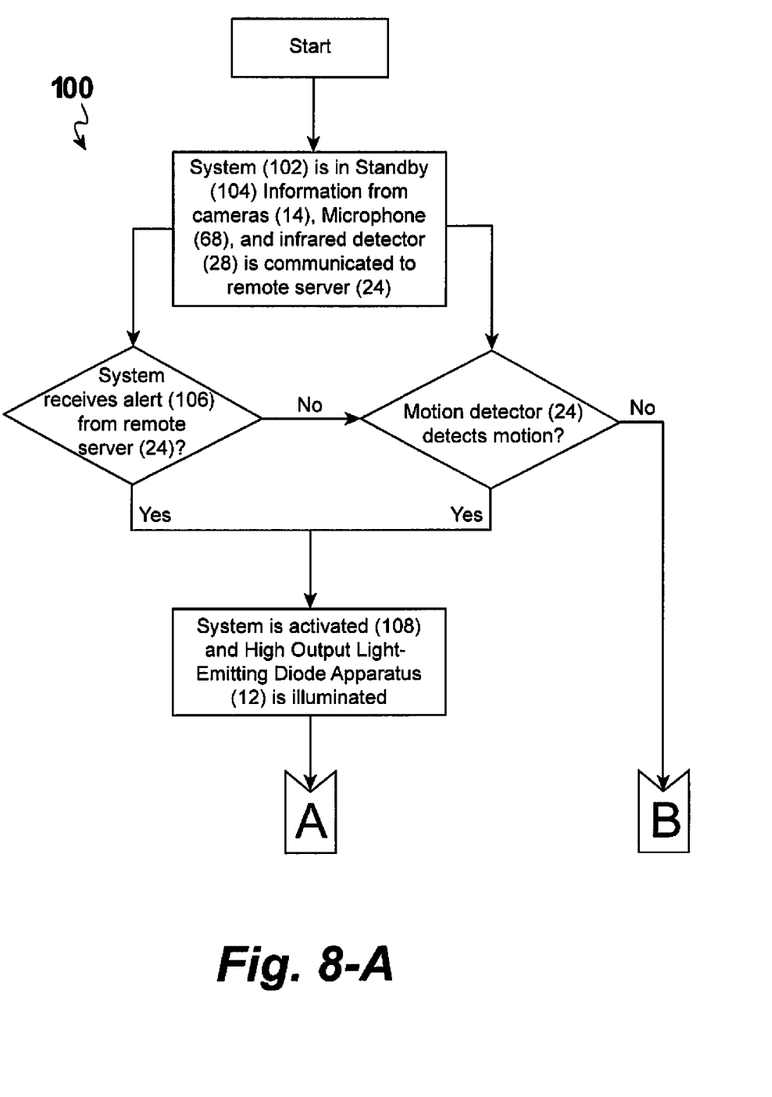
FIGS. 8A-8C is a flow chart of the logic system of an embodiment of the present invention.

In using the device 10, disclosed is the preferred method of surveilling an area utilizing a multifunctional security and surveillance and lighting device 100, wherein said device comprises at least:
a) a computer system 102;
b) at least one optical video camera 14;
c) a microphone 68;
d) an infrared detector 28;

e) a remote server 24;
f) a motion detector 26;
g) a speaker 16; and
i) a high output lighting apparatus 12;

The computer system 102 comprises the computer 20 and power sources 36, 38.

The method comprises the steps of:
1) Having the computer system 102 in standby 104;
2) If the computer system has received an alert 106 from the remote server 24 going to step 4, if not, going to step 3;
3) If the motion detector 26 detects motion going to step 4, if not going to step 9;
4) Activating system 108 and illuminating the high output lighting apparatus 12, then going to step 5;
5) If the system received an audio message 34 to be broadcast from the remote server 24, broadcasting that message 110 by the speaker then going to step 6, if not, going to step 6 without broadcasting 110;
6) If the system received an alert with a specified time to remain active 114 going to step 7, if not going to step 8;
7) Keeping computer system 102 active 112 and illuminating the high output lighting apparatus 12 for the time specified by the alert 114, then going to step 9;
8) Keeping computer system 102 active 112 and illuminating the high output lighting apparatus 12 for a time pre-programmed into the system 116, then going to step 9; and
9) If the system is not in standby 104, returning the system to standby 104, if the system is in standby 104, remaining in standby 104.

In the preferred method, the computer system 102 broadcasts the output of the at least one optical video camera 14, the microphone 68, and the infrared detector 28 to the remote server 24 while in standby 104 and while active 112.

It will be understood that each of the elements described above, or two or more together, may also find a useful application in other types of constructions differing from the types described above.

While the invention has been illustrated and described as embodiments of a MULTIFUNCTIONAL SECURITY SURVEILLANCE AND LIGHTING DEVICE, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A multifunctional security and surveillance and lighting device which comprises:
 a) at least one high output lighting apparatus;
 b) at least one optical video camera;
 c) a speaker;
 d) a housing;
 e) a computer; and
 f) at least one communication means;
 wherein said housing is for containing said at least one high output lighting apparatus, said at least one optical video camera, said speaker, said computer, and said least one communication means;
 wherein said speaker and said at least one high output lighting apparatus are controlled by said computer; and
 wherein said at least one communication means is in communication with said computer;
 wherein said computer receives the output of said at least one optical video camera;
 wherein said computer utilizes said at least one communication means to communicate with a remote server;
 wherein said communication with said remote server includes communicating the output of said at least one optical camera;
 wherein the device further comprises a motion detector;
 wherein said computer receives the output of said motion detector;
 wherein said computer communicates the output of said motion detector with said remote server;
 wherein the device further comprises at least one infrared detector;
 wherein said computer receives the output of said at least one infrared detector;
 wherein said computer utilizes said at least one communication means to communicate with a remote server;
 wherein said communication with said remote server includes communicating the output of said at least one infrared detector;
 wherein said at least one communication means comprises a communication means selected from the list of:
 a) a wired ethernet connection;
 b) a wired coaxial connection via a modem;
 c) a wired fiber optic connection via a modem;
 d) a wired digital subscriber line connection via a modem;
 e) a T-carrier connection via a modem;
 f) a wireless connection via the IEEE 802.11 standard;
 g) a wireless data connection via the Code Division Multiple Access protocol;
 h) a wireless data connection via the Global System for Mobile Communications protocol;
 i) a wireless data connection via the Long Term Evolution protocol;
 wherein communication means (a)-(e) are wired communication means; and
 wherein communication means (f)-(i) are wireless communication means;
 wherein said at least one communication means comprises a first communication means and a second communication means;
 wherein said first communication means is for being the primary means of communication between said computer and said remote server; and
 wherein said second communication means is for being a backup communication means if said first communication means is disabled.

2. The device of claim 1 wherein said first communication means is a wired communication means; and
 wherein said second communication means is a wireless communication means.

3. A multifunctional security and surveillance and lighting device which comprises:
 a) at least one high output lighting apparatus;
 b) at least one optical video camera;
 c) a speaker;
 d) a housing;
 e) a computer; and
 f) at least one communication means;

wherein said housing is for containing said at least one high output lighting apparatus, said at least one optical video camera, said speaker, said computer, and said least one communication means;
wherein said speaker and said at least one high output lighting apparatus are controlled by said computer; and
wherein said at least one communication means is in communication with said computer;
wherein said computer receives the output of said at least one optical video camera;
wherein said computer utilizes said at least one communication means to communicate with a remote server;
wherein said communication with said remote server includes communicating the output of said at least one optical camera;
wherein the device further comprises a motion detector;
wherein said computer receives the output of said motion detector;
wherein said computer communicates the output of said motion detector with said remote server;
wherein the device further comprises at least one infrared detector;
wherein said computer receives the output of said at least one infrared detector;
wherein said computer utilizes said at least one communication means to communicate with a remote server;
wherein said communication with said remote server includes communicating the output of said at least one infrared detector;
wherein said housing comprises a box and a front panel;
wherein said front panel is openable;
wherein said front panel comprises a frame and a pane;
wherein said pane is comprised of a substantially transparent material;
wherein said substantially transparent material is also substantially transparent to infrared radiation; and
wherein said pane is surrounded by and secured by said frame;
wherein said front panel is hingedly attached to said box, with hinges connecting said frame to said box;
wherein said at least one high output light emitting apparatus, said at least one optical video camera, said at least one infrared sensor, and said motion detector are mounted in said box facing said pane;
wherein said pane is partially obscured;
wherein said pane has portions which are not obscured; and
wherein said portions of said pane which are not obscured correspond to each of said at least one high output light emitting apparatus, said at least one optical video camera, said at least one infrared sensor, and said motion detector respectively.

4. The device of claim 3 wherein said pane is partially obscured by a frosted surface.

5. The device of claim 4 wherein said device further comprises an alert light;
wherein said alert light is connected to and controlled by said computer; and
wherein said alert light is mounted on said box.

6. The device of claim 5 wherein said housing has an appearance and size similar to a prior art conventional housing for a high intensity discharge lamp;
wherein said at least one high output lighting apparatus takes less space in said housing than a high intensity discharge lamp would; and
wherein the space freed up by said at least one high output lighting apparatus taking less space is utilized to house the other elements of the present invention, allowing for surveillance of an area.

7. The device of claim 6 wherein said pane has an upper portion and a lower portion;
wherein said frosted surface covers a substantial part of said lower portion of said pane; and
wherein said covering of a substantial part of said lower portion of said pane further facilitates having an appearance similar to a prior art conventional housing for a high intensity discharge lamp.

8. The device of claim 7 wherein the device further comprises a microphone;
wherein said microphone is for surveilling audio in the vicinity of the device.

9. The device of claim 8 wherein said microphone is mounted on the outside of said pane in said lower portion of said pane on a portion thereof which is covered by said frosted surface, so that the microphone is difficult to visibly see.

10. A method of surveilling an area utilizing a multifunctional security and surveillance and lighting device, wherein said device comprises:
   a) a computer system;
   b) at least one optical video camera;
   c) a microphone;
   d) an infrared detector;
   e) a remote server;
   f) a motion detector;
   g) a speaker;
   i) a high output lighting apparatus;
   The method comprises the steps of:
   1) Having the computer system in standby;
   2) If the computer system has received an alert from the remote server going to step 4, if not, going to step 3;
   3) If the motion detector detects motion going to step 4, if not going to step 9;
   4) Activating system and illuminating the high output lighting apparatus, then going to step 5;
   5) If the system received an audio message to be broadcast from the remote server, broadcasting that message by the speaker then going to step 6, if not, going to step 6 without broadcasting;
   6) If the system received an alert with a specified time to remain active going to step 7, if the system has not received such an alert going to step 8;
   7) Keeping computer system active and illuminating the high output lighting apparatus for the time specified by the alert, then going to step 9;
   8) Keeping computer system active and illuminating the high output lighting apparatus for a time pre-programmed into the system, then going to step 9; and
   9) If the system is not in standby, returning the system to standby, if the system is in standby, remaining in standby.

11. The method of claim 10 wherein the computer system broadcasts the output of the at least one optical video camera, the microphone, and the infrared detector to the remote server while in standby and while active.

* * * * *